March 22, 1932. C. R. NIXON 1,850,470

MACHINE AND METHOD OF BLOWING GLASS BOTTLES AND THE LIKE

Filed Dec. 13, 1930 4 Sheets-Sheet 1

Inventor
Clarence R. Nixon,
By E. Salton Brewington.
Attorney

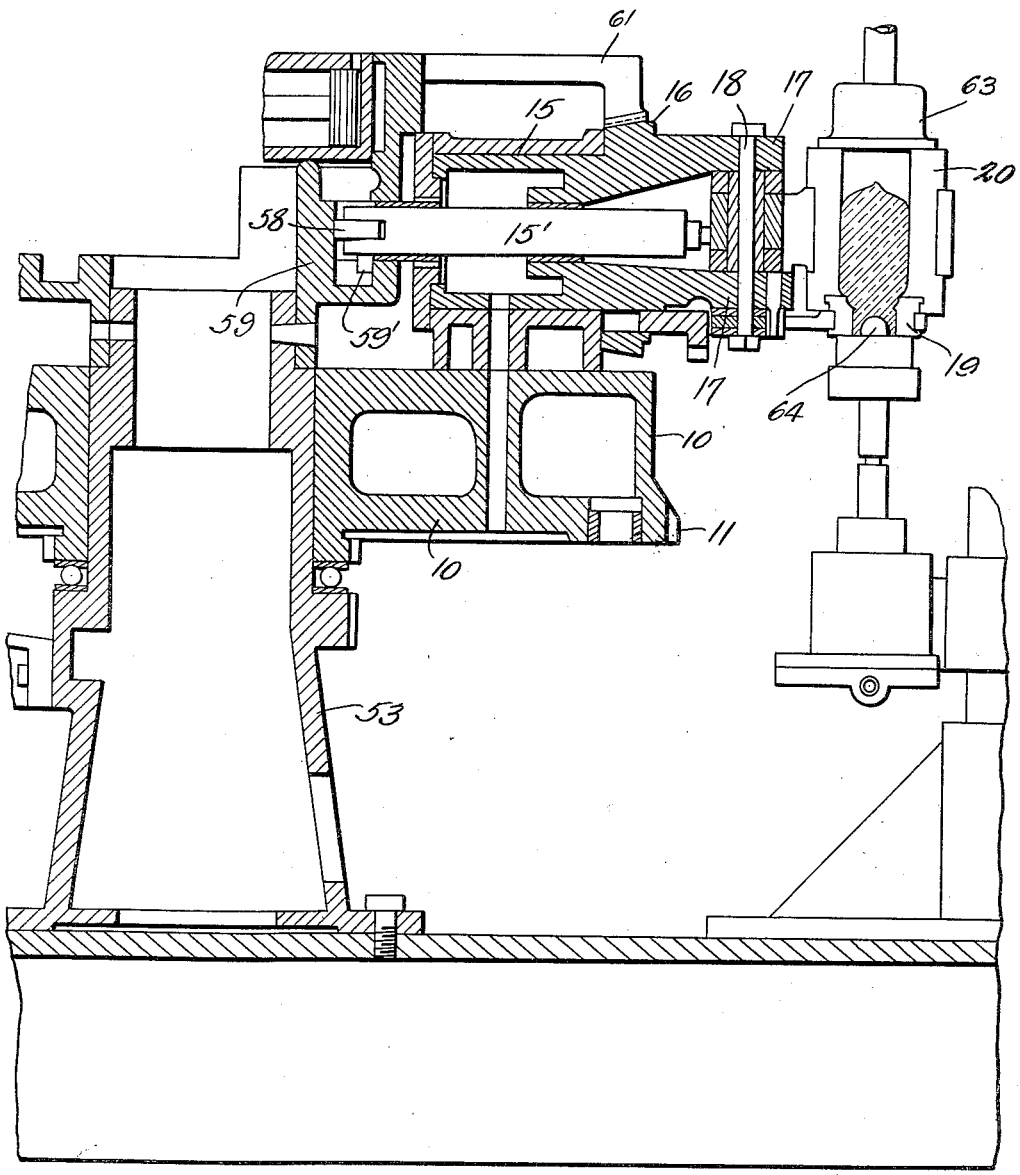

March 22, 1932.                     C. R. NIXON                       1,850,470
              MACHINE AND METHOD OF BLOWING GLASS BOTTLES AND THE LIKE
                      Filed Dec. 13, 1930          4 Sheets-Sheet 3
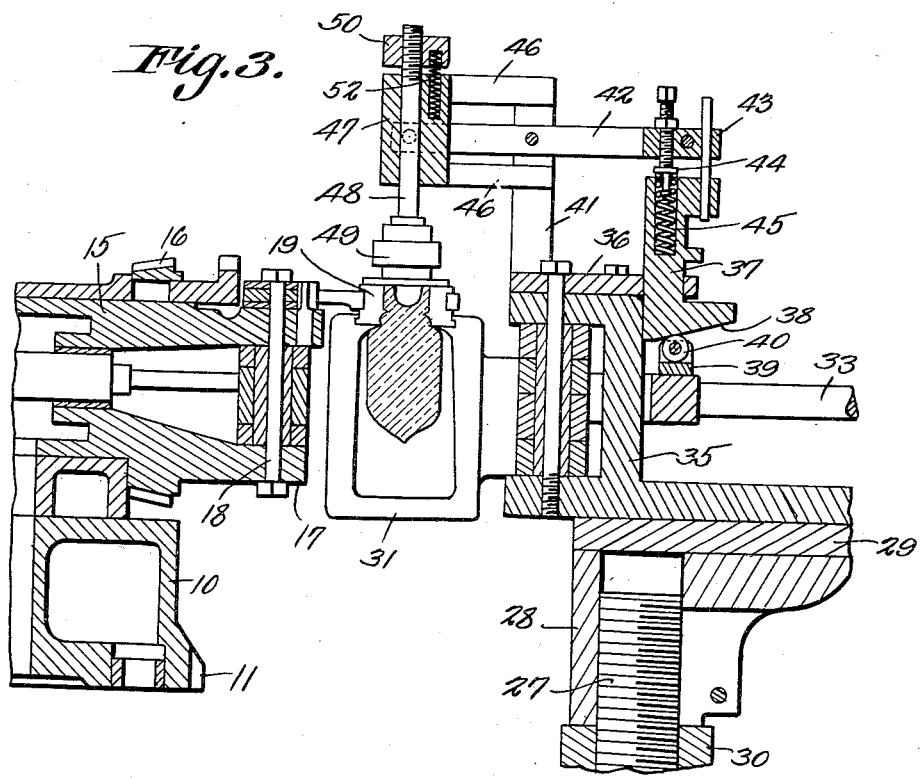
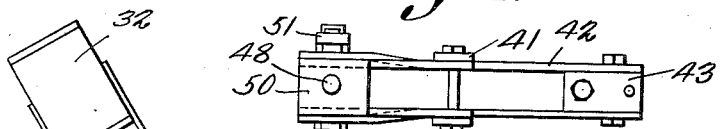
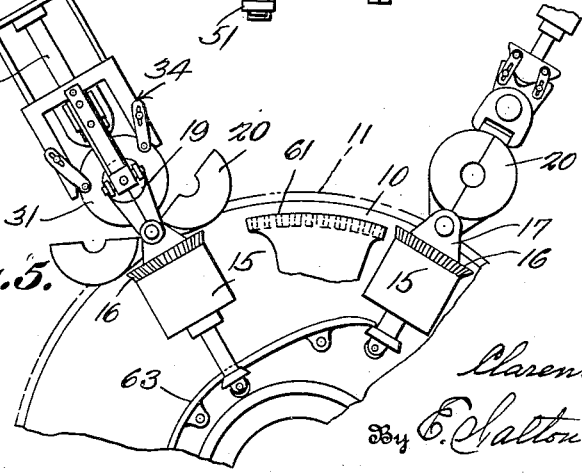
Inventor
Clarence R. Nixon
By E. Salton Brewington
Attorney

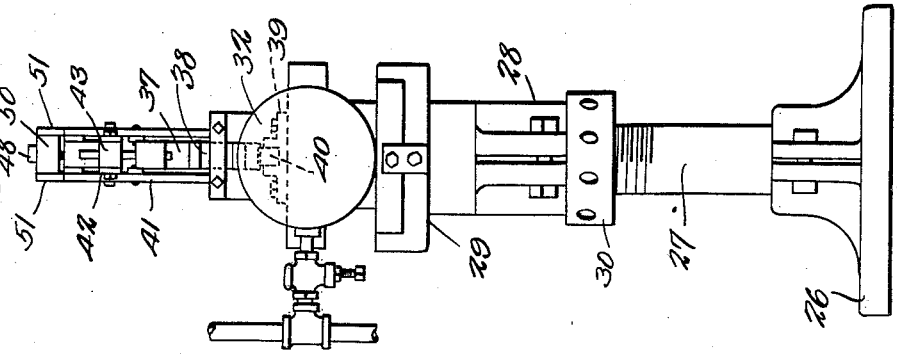
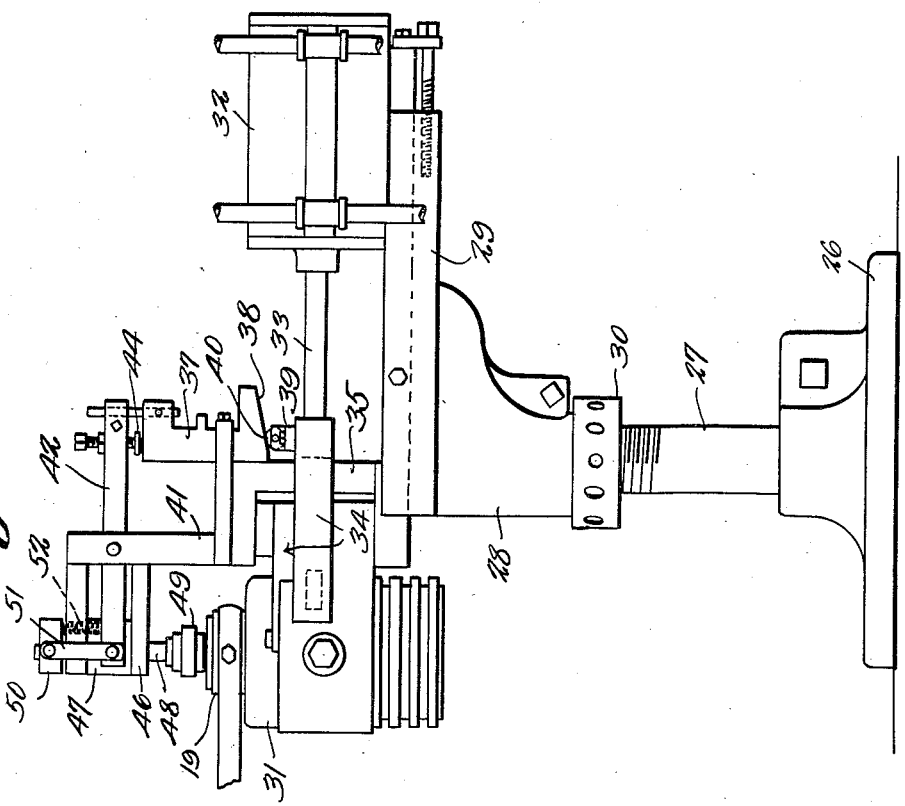

Patented Mar. 22, 1932

1,850,470

UNITED STATES PATENT OFFICE

CLARENCE R. NIXON, OF BALTIMORE, MARYLAND, ASSIGNOR TO THE BALTIMORE BOTTLE MACHINE COMPANY, OF BALTIMORE, MARYLAND, A CORPORATION OF MARYLAND

MACHINE AND METHOD OF BLOWING GLASS BOTTLES AND THE LIKE

Application filed December 13, 1930. Serial No. 502,085.

This invention relates to machines for and methods of blowing hollow glass articles such as bottles and the like.

More especially the invention relates to improvements in the mechanism of and method of blowing employed in the machine known as the "Lynch" machine one form of which is shown and described in the patent issued to J. W. Lynch for apparatus for blowing thin wall glass ware on June 24, 1930 and which bears the number 1,766,135.

In the patent above identified there is employed a pair of tables which carry molds and which rotate to bring the molds into position at several stations. The molds on one table move beneath a charging device located at what is termed the charging and neck forming station. The glass is held in this mold with the mold closed until it has passed the blank forming station and has reached the transfer station. At this point the mold opens and the blank is transferred to the other table, one of the molds of that table closing on the incompletely molded article and remaining closed thereon until the delivery station is reached. Thus the article is held in a closed mold from the time the charge is made until the article is completed and withdrawn except for the momentary opening of the mold of the first table and closing of the mold of the second table. By reason of keeping the article in a closed mold practically throughout its entire formation the exterior of the parts in contact with the mold hardens to a greater extent than those parts out of contact with the mold. Also a hard skin is formed on the exterior. This is due to the fact that the mold acts, to a certain extent, in the manner of the well known "chill" used in casting iron and steel. This is true because, while such molds are kept hot to avoid chilling the charge or partly formed article as much as possible, it is not possible from a practical standpoint to keep the molds so hot that they will not produce considerable chilling.

It has been found that if the article in process of formation be removed from the mold and exposed to the air during part of its movement from the charging to the delivery station the hardened skin and chilled portions of the article will be heated by conduction from the hotter portions so that all of the partly finished article will assume a substantially uniform temperature so that the continuance of the blowing operation will be effected on a uniformly plastic mass. By this means inequalities in the thickness of different parts of the wall of the article will be avoided and the finished article will be of uniform thickness. Also, it is found that articles thus exposed have a much higher and more uniformly polished appearance when finished than those continuously enclosed in a mold during the process of blowing.

One object of the present invention is to provide an improved glass blowing machine wherein provision will be made for removal of the article from the mold during a portion of its movement between the charging and delivery stations.

A second object of the invention is to provide a machine of this character wherein the exposure to air will take place immediately after the primary or blank forming blow.

A third object of the invention is to provide an improved method of blowing hollow articles wherein the article will, between certain steps of its manufacture, be caused to assume substantially uniform plasticity.

In glass blowing machines as at present constructed the blow heads are coapted to the molds by a rapid movement which causes the blow head to strike the mold with considerable violence so that wear of the coapted parts takes place and frequently deformation of the article being manufactured occurs.

A fourth important object of the invention is to provide an improved arrangement of blow head wherein the blow head will be moved gently but firmly onto the mold to effect the blowing operation.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 2 is an enlarged detail section on the line 2—2 of Figure 1.

Figure 3 is an enlarged detail section on the line 3—3 of Figure 1.

Figure 4 is a detail plan view of a certain rock lever arrangement for the blow head.

Figure 5 is a detail plan view of a modified arrangement for opening the molds of the first table.

Figure 6 is an enlarged side elevation of certain parts used at the blank forming or primary blowing station.

Figure 7 is an end elevation of the parts shown in Figure 6.

Figure 1:
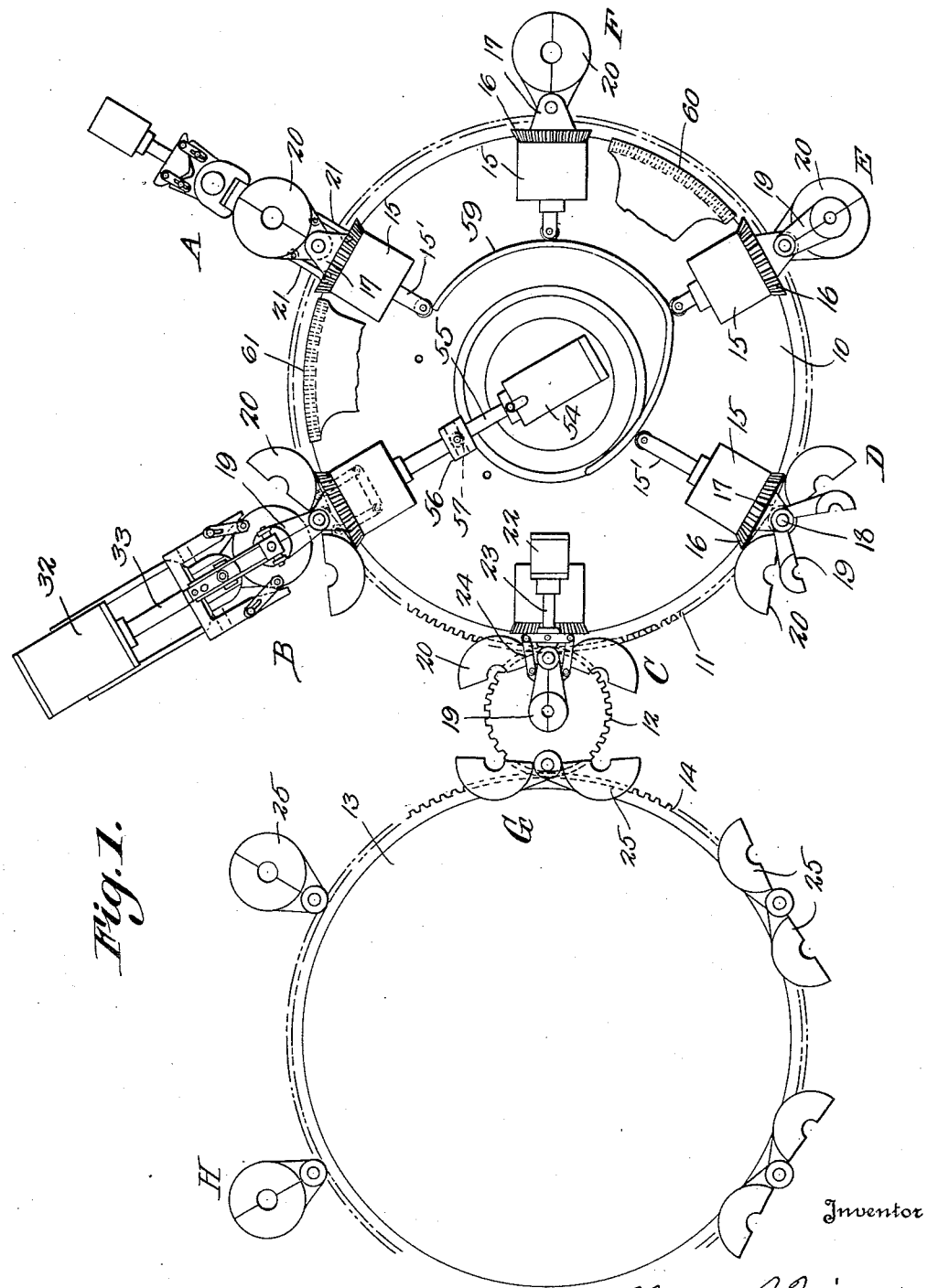
Figure 1 is a general plan view of the arrangement of the tables and molds in this invention.

In the drawings to which reference is had herein many parts are omitted as not being essential to an understanding of the present invention and as being fully illustrated and described in prior patents such as the Lynch Patent, 1,766,135 above referred to. The omitted parts relate principally to the piping, valves and operating means therefor, and the operating mechanism by which the tables are intermittently moved.

As here shown there is provided an intermittently rotated table 10 having a peripheral gear 11 which meshes with an idler gear 12. A second revoluble table 13 is likewise provided with a peripheral gear 14 meshing with the idler 12 so that intermittent motion of one table effects similar intermittent motion of the other table, both tables revolving in the present instance in anti-clockwise directions. As here shown six radially arranged cylinders 15 are mounted on the table 10 in such manner that they may freely revolve on their respective axes. A bevel gear 16 is fixed on the outer end of each of these cylinders. Hinge lugs 17 project outwardly from each of these gears and support a hinge pin 18 whereon is swingingly mounted the two halves of a neck mold 19 and the two halves of a body mold 20, these molds being of the usual form. Each cylinder 15 is provided with a suitable piston rod 15 which is connected by links 21 with the halves of the body mold 20 so that inward movement of the piston effects opening of the body mold and outward movement of the piston effects closing of said body mold. Located at the transfer station C is a second cylinder 22 likewise provided with a piston (not shown) and a rod 23 extends outwardly of this cylinder and is connected by links 24 with the halves of the neck mold 19 so that the mold is opened and closed by respective inward and outward movements of the piston. The table, having six cylinders, is arranged to stop in six positions of which, in Figure 1, A indicates the charging and blow down position or station, B the first blowing or blank forming station and C the transfer station. These three stations relate particularly to the blowing of the article while the remaining three positions are positions in which the molds are made ready to receive the charge as will be presently explained.

Similarly, the table 13 is provided with six pairs of half molds 25 and suitable means (not shown) for opening and closing the same. For this table there is a transfer station G, a final blowing station H and a delivery station I, these being 120 degrees apart and the intermediate positions being idle positions.

Adjacent the table 10 and in radial alinement with station B is the blank blowing device. This device includes a base 26 supporting a screw threaded standard 27 whereon is slidably mounted a sleeve 28 carrying a head 29. A nut 30 has screw engagement with the standard below the lower end of the sleeve so that the head is raised and lowered by suitable rotation of this nut. Pivotally mounted on the head 29 is a pair of body mold jaws 31 which are opened and closed by the action of the cylinder 32, also mounted on the head, and to the piston rod 33 of which they are connected by links 34. Secured to the knee 35 which supports the pivot pin of the mold jaws is a plate 36 wherethrough is vertically slidable a cam head 37 having a bevelled under face 38. A bracket 39 is carried on the piston rod 33 and in turn supports a roller 40 which cooperates with the face 38 to lift the head 37 upon the piston rod moving outwardly of the cylinder to close the mold jaws and allows the head to drop as the piston rod is retracted. A standard 41 projects upwardly from the plate 36 and to this standard are pivoted lever arms 42 which project over the head 37 at the ends adjacent the cylinder. A block 43 is fixed between these ends and carries an adjustable spring seat 44 which engages the upper end of a spring 45 seated in a suitable pocket in the head 37. Arms 46 project from the standard and carry a guide sleeve 47 through which slides a blow head nipple 48 having a blow head 49 on its lower end and a cap or head 50 on its upper end. Links 51 connect this cap with the levers 42 and a spring 52 normally holds the cap and blow head raised. By this means movement of the rod 33 to effect closing of the mold also effects a gentle but firm downward movement of the blow head onto the closed neck mold 19, the degree of pressure being regulated by regulation of the stress on the spring 45 as the seat 44 is adjusted.

The table 10 is arranged to revolve on a suitable standard 53 and on the upper end of this standard is fixed a cylinder 54 which extends radially in alinement with station B. This cylinder is provided with a piston 55 whereon is a head 56 having a transverse slot 57. Each piston rod 15' carries at its end a roller 58 which bears against a cam rib 59 suitably supported in fixed position. Also a pin 59' is carried by the piston adjacent the roller 58. The cam rib has its greatest radius between stations E and A where it is concentric with the table 10. This rib starts at its point of least radius between stations C and D and expands gradually to station E. Between stations E and F is a gear segment 60 wherewith each gear 16 meshes in its travel between these stations, this segment, for reasons presently to be understood, being termed herein, the inverting segment. Similarly, between stations A and B is an erecting gear segment 61.

In the form of the invention shown in Figure 5, the cylinder 54 and its associated parts are omitted, a cam rib 62 being fixedly supported to engage the rollers 58 and pull them and their rods 15' inwardly of the table. This rib 62 extends from station A around to and slightly past station C. This form of operating mechanism being desirable in certain instances in the manufacture of certain grade of goods.

The operation starts at station A. At this station the mold has its neck downward and its bottom open. Into this open end of the mold is dropped a gob of glass in a highly plastic condition, a suitable charging device, (not shown), being used for this purpose. A blow head 63 is now positioned on the open bottom of the mold and this gob or charge is blown down into the neck portion of the mold, the body and neck molds both being closed at this time. During this blowing down operation a plunger 64 is positioned in the neck to form the primary blowing cavity. These steps are all common to the art and are fully described and the necessary mechanism is shown in the Lynch patent above referred. The operations just described take place during the dwell of the mold at station A and as soon as the blow head is lifted the table rotates to bring the mold to station B where it again stops. At this station the pin 59' engages in the slot 57 of the head 56, the piston rod 55 being protracted at this time. In passing from station A to station B the gear 16 engages the segment 61 and the mold is rotated 180 degrees to bring the neck mold uppermost. Upon the table stopping a suitable valve control admits air under pressure to the cylinder 54 and the rod 55 is retracted and the body mold opened. Next, the valve mechanism, admits air under pressure to the cylinder 32 which protracts the piston rod 33 and closes the mold 31. The blow head 49 is, by the movement of the rod 33, brought down on the neck mold 19 and the primary blowing is given. The valve mechanism now operates to reverse the action of cylinder 32, retract the rod 33, permit blow head 49 to lift and open mold 31. The bottle or other article is now left suspended by its neck. In the prior art the body mold 20 remains closed from station A to station C, on the partly blown article but it is to be especially noted that in the present invention the body mold 20 does not close at this time. Instead this body mold remains open and the table again revolves to bring the article to station C with the mold 20 open throughout this movement. Naturally the interior of the hot partly blown article is much hotter than the exterior which has been in contact with the metal of the molds and, in the passage from station B to station C this interior heat spreads by conduction throughout the entire thickness of the side and bottom walls of the article so that, upon arrival at station C, the partly blown article is in a uniformly plastic condition throughout its body and will thus yield uniformly to further blowing. At station C the mold 25 of table 13 closes on the partly blown article and the cylinder 22 acts to release the neck mold. The article is thus transferred to table 13 which revolves, in two steps, to station H where the final blowing takes place, this final blowing effecting the production of an article having uniform wall and bottom thickness (except for such ornamentation, lettering and the like as may be desired) due to its being in a uniformly plastic state at this time. Upon the table 13 revolving two more steps the mold 25 opens and the article is delivered at station I. Meanwhile the mold 15 has travelled from station C around to station A, being closed between stations D and E and inverted between stations E and F.

It is obvious that minor changes may be made in the form and construction of the device without departing from the principles involved. It is therefore desired to include, as the invention, all forms which properly come within the scope claimed.

Having thus described the invention, what is claimed is:—

1. In a glass blowing machine, a travelling mold carrier arranged for alternate travelling movement and cessation of movement, said carrier being arranged to stop at charging, blank blowing and transfer stations, a charging mold including a body mold and a neck mold, said body and neck molds each including separable portions, means at the charging station to hold the separable portions closed at the charging station, means to cause the body mold to lie open at the blank blowing station, a blank forming mold at the blank forming station, means to close the blank forming mold on the glass after the body of the charging mold is opened and to open said blank forming mold, and means to hold the neck mold closed during movement from the blank forming to the transfer station, said body mold being arranged to lie open during the last named movement to expose the body of the blank to the air.

2. In a glass blowing machine, a travelling mold carrier arranged for alternate travelling movement and cessation of movement, said carrier being arranged to stop at charging, blank blowing and transfer stations, a charging mold including a body mold and a neck mold, said body and neck molds each including separable portions, means at the charging station to hold the separable portions closed at the charging station, means to cause the body mold to lie open at the blank blowing station, a blank forming mold at the blank forming station, means to close the blank forming mold on the glass after the body of the charging mold is opened and to open said blank forming mold, means to hold the neck mold closed during movement from the blank forming to the transfer station, said body mold being arranged to lie open during the last named movement to expose the body of the blank to the air, and separate blow heads cooperating with the charging and blank forming molds at the respective charging and blank forming stations.

3. In a glass blowing machine, a travelling mold carrier arranged for alternate travelling movement and cessation of movement, said carrier being arranged to stop at charging, blank blowing and transfer stations, a charging mold including a body mold and a neck mold, said body and neck molds each including separable portions, means at the charging station to hold the separable portions closed at the charging station, means to cause the body mold to lie open at the blank blowing station, a blank forming mold at the blank forming station, means to close the blank forming mold on the glass after the body of the charging mold is opened and to open said blank forming mold, means to hold the neck mold closed during movement from the blank forming to the transfer station, said body mold being arranged to lie open during the last named movement to expose the body of the blank to the air, a second mold carrier connected with the first carrier for alternate stoppage and movement, a finishing mold on said second mold carrier arranged to stop at the transfer station and at blowing and delivery stations, said finishing mold including separable mold parts open upon arrival at the transfer station, and means to close the finishing mold on the blank and to open the neck mold whereby to transfer the blank to the finishing mold.

4. In a glass blowing machine, a travelling mold carrier arranged for alternate travelling movement and cessation of movement, said carrier being arranged to stop at charging, blank blowing and transfer stations, a charging mold including a body mold and a neck mold, said body and neck molds each including separable portions, means at the charging station to hold the separable portions closed at the charging station, means to cause the body mold to lie open at the blank blowing station, a blank forming mold at the blank forming station, means to close the blank forming mold on the glass after the body of the charging mold is opened and to open said blank forming mold, means to hold the neck mold closed during movement from the blank forming to the transfer station, said body mold being arranged to lie open during the last named movement to expose the body of the blank to the air, a second mold carrier connected with the first carrier for alternate stoppage and movement, a finishing mold on said second mold carrier arranged to stop at the transfer station and at blowing and delivery stations, said finishing mold including separable mold parts open upon arrival at the transfer station, means to close the finishing mold on the blank and to open the neck mold whereby to transfer the blank to the finishing mold, and separate blow heads cooperating with the charging, blank forming and finishing molds.

5. In a glass blowing machine, a travelling mold carrier arranged for alternate travelling movement and cessation of movement, said carrier being arranged to stop at charging, blank blowing and transfer stations, a charging mold including a body mold and a neck mold, said body and neck molds each including separable portions, means at the charging station to hold the separable portions closed at the charging station, mold opening and closing means associated with said body mold and travelling therewith, and mechanism engaging said last mentioned means upon arrival at the blank forming station and operable to effect opening movement only of said body mold, a blank forming mold at the blank forming station, means to close the blank forming mold on the glass after the body of the charging mold is opened and to open said blank forming mold, and means to hold the neck mold closed during movement from the blank forming to the transfer station, said body mold being arranged to lie open during the last named movement to expose the body of the blank to the air.

6. In a glass blowing machine, a travelling mold carrier arranged for alternate travelling movement and cessation of movement, said carrier being arranged to stop at charging, blank blowing and transfer stations, a charging mold including a body mold and a neck mold, said body and neck molds each including separable portions, means at the charging station to hold the separable portions closed at the charging station, mold opening and closing means associated with said body mold and travelling therewith, and mechanism engaging said last mentioned means upon arrival at the blank forming station and operable to effect opening movement only of said body mold, a blank forming mold at the blank forming station, means to close the blank forming mold on the glass after the body of the charging mold is opened and to open said blank forming mold, means to hold the neck mold closed during movement from the blank forming to the transfer station, said body mold being arranged to lie open during the last named movement to expose the body of the blank to the air, and separate blow heads cooperating with the charging and blank forming molds at the respective charging and blank forming stations.

7. In a glass blowing machine, a travelling mold carrier arranged for alternate travelling movement and cessation of movement, said carrier being arranged to stop at charging, blank blowing and transfer stations, a charging mold including a body mold and a neck mold, said body and neck molds each including separable portions, means at the charging station to hold the separable portions closed at the charging station, mold opening and closing means associated with said body mold and travelling therewith, and mechanism engaging said last mentioned means upon arrival at the blank forming station and operable to effect opening movement only of said body mold, a blank forming mold at the blank forming station, means to close the blank forming mold on the glass after the body of the charging mold is opened and to open said blank forming mold, means to hold the neck mold closed during movement from the blank forming to the transfer station, said body mold being arranged to lie open during the last named movement to expose the body of the blank to the air, a second mold carrier connected with the first carrier for alternate stoppage and movement, a finishing mold on said second mold carrier arranged to stop at the transfer station and at blowing and delivery stations, said finishing mold including separable mold parts open upon arrival at the transfer station, and means to close the finishing mold on the blank and to open the neck mold whereby to transfer the blank to the finishing mold.

8. In a glass blowing machine, a travelling mold carrier arranged for alternate travelling movement and cessation of movement, said carrier being arranged to stop at charging, blank blowing and transfer stations, a charging mold including a body mold and a neck mold, said body and neck molds each including separable portions, means at the charging station to hold the separable portions closed at the charging station, mold opening and closing means associated with said body mold and travelling therewith, and mechanism engaging said last mentioned means upon arrival at the blank forming station and operable to effect opening movement only of said body mold, a blank forming mold at the blank forming station, means to close the blank forming mold on the glass after the body of the charging mold is opened and to open said blank forming mold, means to hold the neck mold closed during movement from the blank forming to the transfer station, said body mold being arranged to lie open during the last named movement to expose the body of the blank to the air, a second mold carrier connected with the first carrier for alternate stoppage and movement, a finishing mold on said second mold carrier arranged to stop at the transfer station and at blowing and delivery stations, said finishing mold including separable mold parts open upon arrival at the transfer station, means to close the finishing mold on the blank and to open the neck mold whereby to transfer the blank to the finishing mold, and separate blow heads cooperating with the charging, blank forming and finishing molds.

9. In a glass blowing machine, a split mold having its parts hinged to close on each other and to open from each other, pneumatic means for closing and opening said mold and including a cylinder having a longitudinally movable piston rod, a blow head movable toward and from the mold in axial alinement with the closed position of said mold, operating mechanism for so moving the blow head, and means carried by the piston rod for effecting operation of said mechanism upon movement of the rod in one direction.

10. In a glass blowing machine, a split mold having its parts hinged to close on each other and to open from each other, pneumatic means for closing and opening said mold and including a cylinder having a longitudinally movable piston rod, a blow head movable toward and from the mold in axial alinement with the closed position of said mold, operating mechanism for so moving the blow head, means carried by the piston rod for effecting operation of said mechanism upon movement of the rod in one direction, and other means for effecting reverse operation of said mechanism upon movement of the rod in the opposite direction.

11. In a glass blowing machine, a split mold having its parts hinged to close on each other and to open from each other, pneumatic means for closing and opening said mold and including a cylinder having a longitudinally movable piston rod, a blow head movable toward and from the mold in axial alinement with the closed position of said mold, operating mechanism for so moving the blow head, means carried by the piston rod to engage said mechanism and effect operation thereof to move the blow head toward the mold upon mold closing movement of the piston rod, and spring means to effect movement of the blow head from the mold upon opposite movement of said rod.

In testimony whereof I affix my signature.
CLARENCE R. NIXON.